United States Patent
Oda et al.

(10) Patent No.: US 9,559,347 B2
(45) Date of Patent: Jan. 31, 2017

(54) NEGATIVE ELECTRODE TERMINAL FOR BATTERY AND METHOD FOR PRODUCING NEGATIVE ELECTRODE TERMINAL FOR BATTERY

(75) Inventors: Yoshimitsu Oda, Suita (JP); Masaaki Ishio, Suita (JP)

(73) Assignee: HITACHI METALS, LTD., Tokyo (JP)

( * ) Notice: Subject to any disclaimer, the term of this patent is extended or adjusted under 35 U.S.C. 154(b) by 199 days.

(21) Appl. No.: 14/119,794

(22) PCT Filed: May 31, 2012

(86) PCT No.: PCT/JP2012/064132
§ 371 (c)(1),
(2), (4) Date: Nov. 22, 2013

(87) PCT Pub. No.: WO2012/165567
PCT Pub. Date: Dec. 6, 2012

(65) Prior Publication Data
US 2014/0099543 A1    Apr. 10, 2014

(30) Foreign Application Priority Data
Jun. 2, 2011  (JP) ................. 2011-124612

(51) Int. Cl.
*H01M 2/30* (2006.01)
*H01M 2/06* (2006.01)
*H01M 2/20* (2006.01)

(52) U.S. Cl.
CPC ............. *H01M 2/30* (2013.01); *H01M 2/06* (2013.01); *H01M 2/202* (2013.01); *Y10T 29/49108* (2015.01)

(58) Field of Classification Search
None
See application file for complete search history.

(56) References Cited

U.S. PATENT DOCUMENTS

2010/0081048 A1* 4/2010 Nansaka ............... H01M 2/06
   429/158
2011/0244309 A1* 10/2011 Byun ................... H01M 2/043
   429/158
(Continued)

FOREIGN PATENT DOCUMENTS

JP   57-76750 A   5/1982
JP   2001-6746 A  1/2001
(Continued)

OTHER PUBLICATIONS

International Search Report dated Jul. 24, 2012 issued in corresponding application No. PCT/JP2012/064132.
(Continued)

*Primary Examiner* — Daniel Gatewood
(74) *Attorney, Agent, or Firm* — Westerman, Hattori, Daniels & Adrian, LLP (57) ABSTRACT

A negative electrode terminal for a battery in which a first metal layer and a second metal layer hardly separate from each other is provided by inhibiting an intermetallic compound from being formed between the first metal layer and the second metal layer. This negative electrode terminal (8) for a battery is composed of a clad material formed by bonding a first metal layer (80), made of Al, including a first region connected with a battery terminal connecting plate and an adjacent second region on the same surface side as the first region and a second metal layer (81), made of Ni, connected with battery negative electrodes, while the second metal layer is arranged to be stacked on the first metal layer in the second region of the first metal layer.

19 Claims, 5 Drawing Sheets

(56) References Cited

U.S. PATENT DOCUMENTS

2011/0293995 A1* 12/2011 Sasaki .................. H01M 2/202
                                                       429/158
2012/0021278 A1*  1/2012 Byun .................. H01M 2/0473
                                                       429/179

FOREIGN PATENT DOCUMENTS

| JP | 2001-35475 A   | 2/2001 |
| JP | 2010-80355 A   | 4/2010 |
| JP | 2012-123946 A  | 6/2012 |

OTHER PUBLICATIONS

Office Action dated Aug. 4, 2015, issued in counterpart Chinese Patent Application No. 201280023530.7, with English translation (11 pages).

* cited by examiner

NEGATIVE ELECTRODE TERMINAL FOR BATTERY AND METHOD FOR PRODUCING NEGATIVE ELECTRODE TERMINAL FOR BATTERY

TECHNICAL FIELD

The present invention relates to a negative electrode terminal for a battery and a method for producing a negative electrode terminal for a battery, and more particularly, it relates to a negative electrode terminal for a battery in which members made of different metallic materials are bonded to each other and a method for producing the negative electrode terminal for a battery.

BACKGROUND ART

In general, a terminal for a battery in which a plurality of members made of different metallic materials are bonded to each other is known. Such a terminal for a battery is disclosed in Japanese Patent Laying-Open No. 2001-6746, for example.

In Japanese Patent Laying-Open No. 2001-6746, there is disclosed a lithium ion battery including a battery can made of Al for functioning as a positive electrode, a clad body (positive electrode terminal) whose one surface side is welded to the battery can while a lead (battery terminal connecting plate) made of a metallic material such as Ni, copper, Ni-platted copper, an Ni alloy or a copper alloy is welded to another surface side and a negative electrode terminal connected to a negative electrode in a state insulated from the battery can. In the clad body of this lithium ion battery, an Al layer and an Ni layer are bonded to each other so that the Al layer (first metal layer) is positioned on one surface side welded to the battery can and the Ni layer (second metal layer) is positioned on another surface side to which the lead is welded. Thus, Ni and Ni larger in electrical resistance than Al are welded to each other, whereby it becomes possible to easily weld the lead and the clad body to each other by resistance welding. It is conceivable that the technique of connecting the lead and the positive electrode to each other through the clad body employing the metallic material easily weldable to the lead and the metallic material easily weldable to the positive electrode material in this manner is applicable also to a case of connecting the lead and the negative electrode to each other. Although not clearly described in Japanese Patent Laying-Open No. 2001-6746, it is conceivable that the clad body is in such a state (overlay (OVERLAYS) shape) that the Al layer and the Ni layer are bonded to each other over the whole surfaces.

PRIOR ART

Patent Document

Patent Document 1: Japanese Patent Laying-Open No. 2001-6746

SUMMARY OF THE INVENTION

Problem to be Solved by the Invention

However, although application to connection between a negative electrode terminal made of Cu and an Al lead made of Al has been examined through the clad body of the Al layer and the Ni layer disclosed in Japanese Patent Laying-Open No. 2001-6746, there is a case where part of heat applied when welding the Al lead and the Al layer of the clad body to each other reaches the interface between the Al layer and the Ni layer corresponding to a portion where the lead and the clad body are welded to each other and an intermetallic compound containing Al and Ni is formed on the interface between the Al layer and the Ni layer due to the heat, in the case where the Al layer and the Ni layer are bonded to each other over the whole surfaces. It has been recognized that bonding strength between the Al layer (first metal layer) and the Ni layer (second metal layer) lowers due to the intermetallic compound on the interface in this case, to cause such an inconvenience that the Al layer (first metal layer) and the Ni layer (second metal layer) separate from each other as a result.

The present invention has been proposed in order to solve the aforementioned problem, and an object of the present invention is to provide a negative electrode terminal for a battery in which a first metal layer and a second metal layer hardly come off each other by inhibiting an intermetallic compound from being formed on the interface between the first metal layer and the second metal layer.

Means for Solving the Problem

A negative electrode terminal for a battery according to a first aspect of the present invention is a negative electrode for a battery configured to be connectable to a battery terminal connecting plate for connecting battery terminals of a plurality of batteries with each other and battery negative electrodes of the batteries and to be arrangeable on upper surfaces of lids of battery cases of the batteries, composed of a clad material formed by bonding a first metal layer, made of Al or an Al alloy, including a first region connected with the battery terminal connecting plate and an adjacent second region on the same surface side as the first region and a second metal layer, made of Ni or an Ni alloy, connected with the battery negative electrodes, while the second metal layer is arranged to be stacked on the first metal layer in the second region of the first metal layer.

Such a structure that the second metal layer is embedded in part of the first metal layer or the like is included in the aforementioned "first metal layer" and the "second metal layer". Further, a case of including a region actually connected with the battery terminal connecting plate and a region on the periphery thereof is also included in the aforementioned "first region connected with the battery terminal connecting plate", in addition to a case of including only the region actually connected with the battery terminal connecting plate. The aforementioned "adjacent second region on the same surface side as the first region" means that this is a region present on the same surface side as the first region connected with the battery terminal connecting plate, adjacent to the first region connected with the battery terminal connecting plate, and a region different from the first region connected with the battery terminal connecting plate. Further, not only a case where the first region and the second region are on the same surface (flush with each other), but also a case where the same are on the same surface side through a step portion or the like is also included in "on the same surface side".

In the negative electrode terminal for a battery according to the first aspect of the present invention, as hereinabove described, the second metal layer is arranged to be stacked on the first metal layer in the second region of the first metal layer including the first region connected with the battery terminal connecting plate and the adjacent second region on the same surface side as the first region so that the second metal layer is not arranged on the first region connected with the battery terminal connecting plate, whereby heat at a time when the negative electrode terminal for a battery and the battery terminal connecting plate are connected with each other can be inhibited from reaching the interface between the first metal layer and the second metal layer. Thus, an intermetallic compound containing Al and Ni can be inhibited from being formed on the interface between the first metal layer and the second metal layer, whereby bonding strength between the first metal layer and the second metal layer can be inhibited from lowering. Consequently, the first metal layer and the second metal layer can be inhibited from coming off each other.

Preferably in the aforementioned negative electrode terminal for a battery according to the first aspect, the first metal layer made of Al or an Al alloy is configured to be connectable to the battery terminal connecting plate made of Al or an Al alloy, and the second metal layer made of Ni or an Ni alloy is configured to be connectable to the battery negative electrodes made of Cu or a Cu alloy. When structured in this manner, battery terminals of a plurality of batteries can be electrically connected with each other by employing the battery terminal connecting plate made of Al or an Al alloy. At this time, Al or an Al alloy is lighter in weight than Cu or Ni which is the material for a general battery terminal connecting plate, whereby the weight of a battery assembly constituted of a plurality of batteries and a plurality of battery terminal connecting plates connecting the respective batteries with each other can be reduced. When configuring the second metal layer made of Ni or an Ni alloy to be connectable to the battery negative electrodes made of Cu or a Cu alloy, a fragile intermetallic compound containing Al and Cu can be inhibited from being formed on connected portions, dissimilarly to a case of connecting the first metal layer made of Al or an Al alloy to the battery negative electrodes. Thus, the negative electrode terminal for a battery and the battery negative electrodes can be strongly connected to each other.

Preferably in the aforementioned negative electrode terminal for a battery according to the first aspect, the first metal layer and the second metal layer are arranged on the same surface side, opposite to the batteries, of the negative electrode terminal for a battery. When structured in this manner, the battery terminal connecting plate can be easily connected to the first metal layer from the surface side, opposite to the batteries, of the negative electrode terminal for a battery, and the battery negative electrodes can be easily connected to the second metal layer.

Preferably in this case, the second metal layer stacked on the first metal layer is connected with the battery negative electrodes in the second region of the first metal layer, a recess portion is formed in the second region of the first metal layer, and the second metal layer is bonded to the first metal layer in a state embedded in the recess portion of the first metal layer. When structured in this manner, positioning of the second metal layer embedded in the recess portion can be easily performed due to the recess portion of the first metal layer.

Preferably in the aforementioned negative electrode terminal for a battery in which the second metal layer is embedded in the recess portion, the recess portion of the first metal layer is formed to extend from one end portion up to another end portion in a second direction orthogonal to a first direction, in which the first region and the second region are adjacent to each other, in the second region, and the second metal layer is embedded in the recess portion of the first metal layer to extend from one end portion up to another end portion in the second direction. When structured in this manner, a plurality of negative electrode terminals for batteries having recess portions can be easily obtained from one terminal material by cutting the terminal material in which recess portions and second metal layers are formed in a striped manner to extend in the second direction in the first direction at prescribed intervals in the second direction or the like in a case of forming the plurality of negative electrode terminals for batteries from one terminal material.

Preferably in the aforementioned negative electrode terminal for a battery in which the recess portion is formed in the first metal layer, the recess portion is a groove portion, and the second metal layer is embedded in the groove portion of the first metal layer to extend from one end portion up to another end portion in the second direction in a state where both end surfaces in the first direction are not exposed. When structured in this manner, not only the upper surface of the first metal layer positioned on one side in the first direction with respect to the second metal layer but also the upper surface of the first metal layer positioned on another side can be pressed when forming the clad material, dissimilarly to a case where the negative electrode terminal for a battery is made of a clad material having such a shape (edgelay (EGELAYS) shape) that an end surface of a second metal layer is exposed. Thus, the clad material in which the first metal layer and the second metal layer are bonded to each other can be easily formed. Further, a pair of inner side surfaces of the groove portion of the first metal layer and both end surfaces of the second metal layer in the first direction can be bonded to each other respectively, whereby the bonding strength between the first metal layer and the second metal layer can be improved as compared with a clad material having an edgelay shape bonding only one side.

Preferably in the aforementioned negative electrode terminal for a battery in which the recess portion is the groove portion, the width of the groove portion of the first metal layer in the first direction is not more than half of the length of the first metal layer in the first direction. When structured in this manner, the first region connected with the battery terminal connecting plate can be sufficiently ensured in the first metal layer, whereby the negative electrode terminal for a battery and the battery terminal connecting plate can be easily connected with each other.

Preferably in the aforementioned negative electrode terminal for a battery in which the recess portion is formed in the first metal layer, the recess portion is a notch portion, and the second metal layer is bonded to the notch portion of the first metal layer to extend from one end portion up to another end portion in the second direction in a state where one end surface in the first direction is exposed. When structured in this manner, a mask for the first metal layer may be formed only on one side of the second metal layer in a case of forming the mask on the surface of the first metal layer and working only the surface of the second metal layer, for example, dissimilarly to a case where the negative electrode terminal for a battery is made of a clad material having such a shape (inlay (INLAYS) shape) that both end surfaces of a second metal layer are not exposed, whereby only the surface of the second metal layer can be easily worked.

Preferably in the aforementioned negative electrode terminal for a battery in which the first metal layer and the second metal layer are arranged on the same surface side opposite to the batteries, the first metal layer in the first region and the second metal layer stacked on the first metal layer in the second region are adjacently provided in the form of planar surfaces. When structured in this manner, foreign matter is inhibited from coming into contact with or getting caught by a connected portion between the first metal layer and the second metal layer, dissimilarly to a case where uneven shapes are formed by the first metal layer and the second metal layer. Thus, the first metal layer and the second metal layer can be inhibited from coming off each other from the connected portion, serving as a starting point, between the first metal layer and the second metal layer.

Preferably in the aforementioned negative electrode terminal for a battery according to the first aspect, the thickness of the second metal layer is not more than the thickness of the first metal layer in the second region. When structured in this manner, the electrical resistance and the weight of the negative electrode terminal for a battery made of the clad material of the first metal layer and the second metal layer can be inhibited from increasing by setting the thickness of the second metal layer made of Ni or the Ni alloy larger in electrical resistance and weight (specific gravity) per unit volume than Al or an Al alloy to not more than the thickness of the first metal layer made of Al or an Al alloy.

Preferably in this case, the thickness of the second metal layer is at least 10% and not more than 50% of the total thickness of the first metal layer and the second metal layer in the second region. When structured in this manner, the electrical resistance and the weight of the negative electrode terminal for a battery can be more inhibited from increasing.

Preferably in the aforementioned negative electrode terminal for a battery according to the first aspect, the clad material constituting the negative electrode terminal for a battery is configured to be arrangeable on the upper surfaces of the lids of the battery cases in a state insulated from the lids of the battery cases. When structured in this manner, a short circuit between the negative electrode terminal for a battery and the lids of the battery cases can be prevented by insulating the negative electrode terminal for a battery and the lids of the battery cases from each other.

Preferably in the aforementioned negative electrode terminal for a battery according to the first aspect, at least part of the first metal layer in the first region is provided in the form of a planar surface to be weldable to the battery terminal connecting plate in the form of a flat plate. When structured in this manner, the first metal layer in the form of a planar surface and the battery terminal connecting plate in the form of a flat plate can be easily welded to each other.

Preferably in the aforementioned negative electrode terminal for a battery according to the first aspect, a hole portion passing through the first metal layer and the second metal layer is formed in the second region, and the negative electrode terminal for a battery is so configured that the battery negative electrodes inserted into the hole portion are connectable to at least the inner peripheral surface of the second metal layer. When structured in this manner, the battery negative electrodes inserted into the hole portion and the second metal layer can be more reliably electrically connected with each other.

Preferably in the aforementioned negative electrode terminal for a battery according to the first aspect, the first metal layer includes a protrusive portion formed on the first region and engageable with the battery terminal connecting plate. When structured in this manner, the battery terminal connecting plate and the first metal layer can be positioned due to the protrusive portion of the first metal layer, whereby the battery terminal connecting plate and the first metal layer can be reliably connected with each other.

Preferably in the aforementioned negative electrode terminal for a battery in which the first metal layer is connectable to the battery terminal connecting plate made of Al or an Al alloy, the first metal layer is connectable with battery positive electrodes of the batteries, and made of the same metallic material as a positive electrode terminal for a battery, made of Al or an Al alloy, connected with the battery terminal connecting plate. When structured in this manner, the positive electrode terminal for a battery and the first metal layer of the negative electrode terminal for a battery made of the same metal material (Al or an Al alloy) can be connected with each other by employing the battery terminal connecting plate made of Al or an Al alloy, whereby the weight of a battery assembly constituted of a plurality of batteries and a plurality of battery terminal connecting plates connecting the respective batteries with each other can be more reduced.

A method for producing a negative electrode terminal for a battery according to a second aspect of the present invention is a method for producing a negative electrode terminal for a battery configured to be connectable to a battery terminal connecting plate for connecting battery terminals of a plurality of batteries with each other and battery negative electrodes of the batteries and to be arrangeable on upper surfaces of lids of battery cases of the batteries, including steps of preparing a first metal material, extending in a prescribed direction, capable of plurally forming a first metal layer, made of Al or an Al alloy, including a first region connected with the battery terminal connecting plate and an adjacent second region on the same surface side as the first region, preparing a second metal material, extending in the prescribed direction, capable of plurally forming a second metal layer, made of Ni or an Ni alloy, connected with the battery negative electrodes, forming a clad material in which the second metal material is arranged to be stacked on the first metal material in the second region of the first metal layer to extend in the prescribed direction by bonding the second metal material to the first metal material to be stacked along the prescribed direction, and forming a plurality of negative electrode terminals for batteries each including the first metal layer and the second metal layer from the clad material.

As hereinabove described, the method for producing a negative electrode terminal for a battery according to the second aspect of the present invention includes the steps of forming the clad material in which the second metal material is arranged to be stacked on the first metal material in the second region of the first metal layer including the first region connected with the battery terminal connecting plate and the adjacent second region on the same surface side as the first region and forming the plurality of negative electrode terminals for batteries each including the first metal layer and the second metal layer from the clad material so that the second metal layer is not arranged in the first region connected with the battery terminal connecting plate, whereby heat at a time when the negative electrode terminal for a battery and the battery terminal connecting plate are connected with each other can be inhibited from reaching the interface between the first metal layer and the second metal layer. Thus, an intermetallic compound containing Al and Ni can be inhibited from being formed on the interface between the first metal layer and the second metal layer, whereby bonding strength between the first metal layer and the second metal layer can be inhibited from lowering. Consequently, the first metal layer and the second metal layer can be inhibited from coming off each other. Further, the method includes the step of forming the clad material to extend in the prescribed direction, whereby a plurality of negative electrode terminals for batteries can be easily obtained from one clad material by cutting the clad material in a direction orthogonal to the prescribed direction or the like.

Preferably in the aforementioned method for producing a negative electrode terminal for a battery according to the second aspect, the step of preparing the first metal material includes a step of forming a recess portion extending along the prescribed direction in the second region of the first metal layer, and the step of forming the clad material to extend in the prescribed direction includes a step of bonding the first metal material and the second metal material to each other in a state of arranging the second metal material in the recess portion of the first metal material along the prescribed direction. When structured in this manner, positioning of the second metal layer embedded in the recess portion can be easily performed due to the recess portion of the first metal layer.

Preferably in this case, the recess portion is a groove portion, and the step of bonding the first metal material and the second metal material to each other in the state of arranging the second metal material in the recess portion has a step of bonding the first metal material and the second metal material to each other in a state of arranging the second metal material in the recess portion of the first metal material along the prescribed direction so that both end surfaces in a direction orthogonal to the prescribed direction are not exposed. When structured in this manner, not only the upper surface of the first metal layer positioned on one side in the first direction with respect to the second metal layer but also the upper surface of the first metal layer positioned on another side can be pressed when forming the clad material, dissimilarly to a case where the negative electrode terminal for a battery is made of a clad material having such a shape (edgelay (EGELAYS) shape) that an end surface of the second metal layer is exposed. Thus, the clad material in which the first metal layer and the second metal layer are bonded to each other can be easily formed. Further, a pair of inner side surfaces of the groove portion of the first metal layer and both end surfaces of the second metal layer in the first direction can be bonded to each other respectively, whereby the bonding strength between the first metal layer and the second metal layer can be improved as compared with a clad material having such an edgelay shape that only one side can be bonded.

Preferably in the aforementioned method for producing a negative electrode terminal for a battery according to the second aspect, the step of forming the plurality of negative electrode terminals for batteries from the clad material includes a step of forming the plurality of negative electrode terminals for batteries from the clad material by punching the plurality of negative electrode terminals for batteries out of the clad material at prescribed intervals in the prescribed direction. When structured in this manner, a plurality of negative electrode terminals for batteries having prescribed shapes can be easily obtained from one clad material.

Effect of the Invention

According to the present invention, as hereinabove described, the first metal layer and the second metal layer can be inhibited from coming off each other.

MODES FOR CARRYING OUT THE INVENTION

An embodiment of the present invention is now described on the basis of the drawings.

First, the structure of a lithium ion battery assembly 100 according to the embodiment of the present invention is described with reference to FIGS. 1 to 7.

Figure 1:
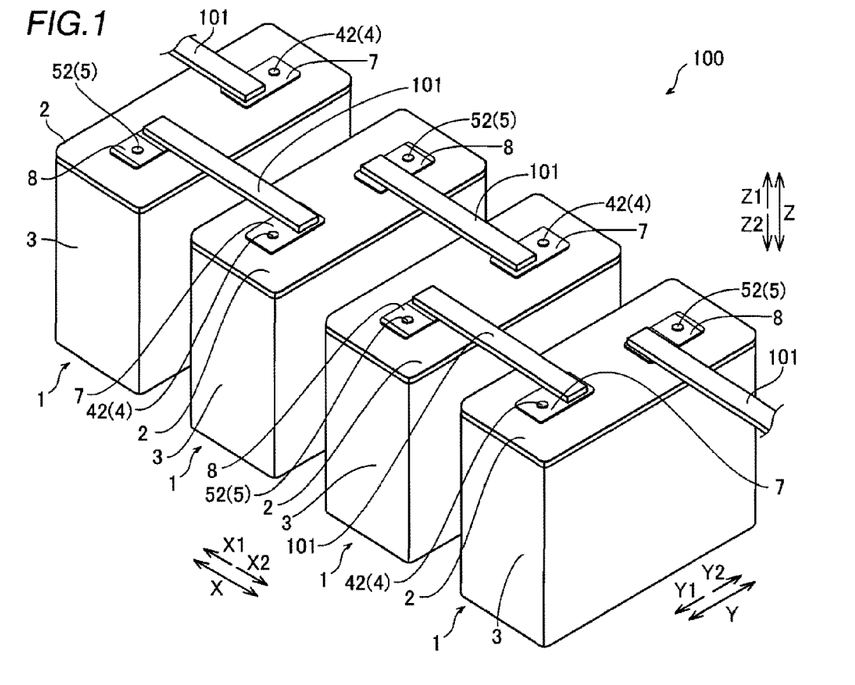
FIG. 1 A perspective view showing a lithium ion battery assembly according to an embodiment of the present invention.

The lithium ion battery assembly 100 according to the embodiment of the present invention is a large-sized battery system employed for an electric vehicle (EV, electric vehicle), a hybrid vehicle (HEV, hybrid electric vehicle), a residential power storage system or the like. This lithium ion battery assembly 100 is constituted of a plurality of lithium ion batteries 1 electrically connected with each other by a plurality of bus bars 101 in the form of flat plates, as shown in FIG. 1. The lithium ion batteries 1 are examples of the "batteries" in the present invention, and the bus bars 101 are examples of the "battery terminal connecting plate" in the present invention.

In the lithium ion battery assembly 100, the plurality of lithium ion batteries 1 are arranged to line up along the short-side direction (X direction) of the lithium ion batteries 1 in plan view. In the lithium ion battery assembly 100, further, lithium ion batteries 1 in which positive electrode terminals 7 described later are positioned on one side (Y1 side) in a Y direction while negative electrode terminals 8 described later are positioned on another side (Y2 side) in the Y direction and lithium ion batteries 1 in which positive electrode terminals 7 are positioned on the Y2 side and negative electrode terminals 8 are positioned on the Y1 side are alternately arranged along the X direction.

The positive electrode terminal 7 of a prescribed lithium ion battery 1 is welded (bonded) to one X-directional end of a bus bar 101, made of Al, extending in the X direction by resistance welding. The negative electrode terminal 8 of the lithium ion battery 1 adjacent to the prescribed lithium ion battery 1 is welded to another X-directional end of the bus bar 101 made of Al by resistance welding. Thus, the positive electrode terminals 7 of the lithium ion batteries 1 are connected with the negative electrode terminals 8 of the adjacent lithium ion batteries 1 through the bus bars 101 made of Al. The lithium ion battery assembly 100 in which the plurality of lithium ion batteries 1 are connected in series with each other is constituted in this manner.

Figure 2:
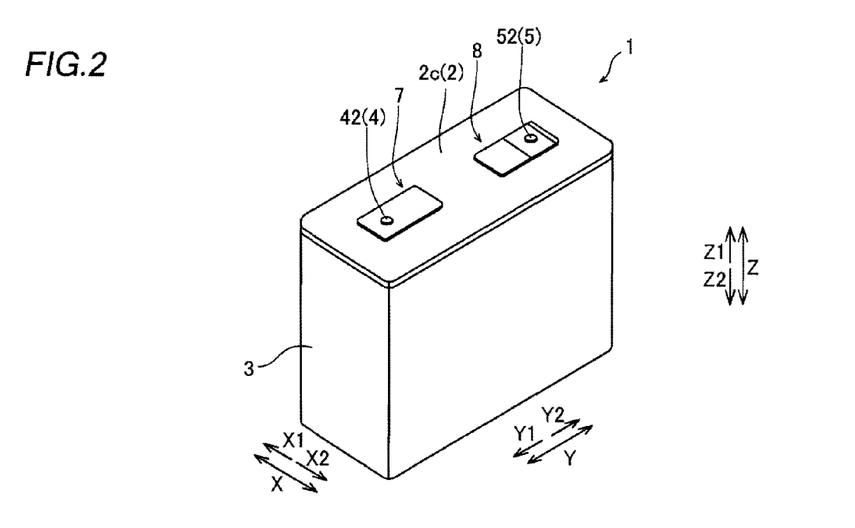
FIG. 2 A perspective view showing the overall structure of a lithium ion battery according to the embodiment of the present invention.

Each lithium ion battery 1 has an outer shape substantially in the form of a rectangular parallelepiped, as shown in FIG. 2. Further, the lithium ion battery 1 includes a lid member 2 arranged upward (on the Z1 side) and a battery case body 3 arranged downward (on the Z2 side). This lid member 2 and the battery case body 3 are both formed by Ni-plated steel plates. The lid member 2 is an example of the "lids of the battery cases" in the present invention.

Figure 3:
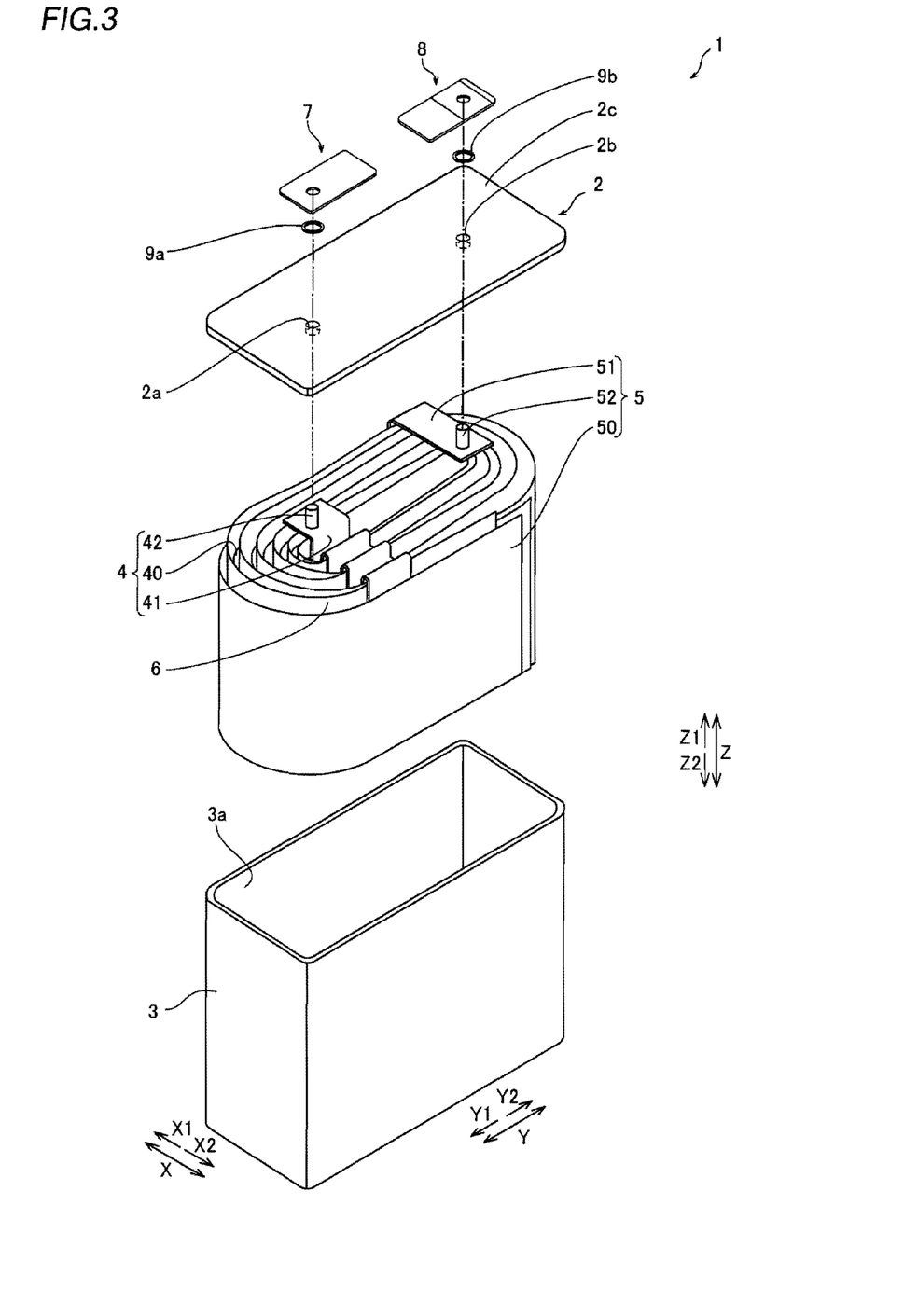
FIG. 3 An exploded perspective view showing the overall structure of the lithium ion battery according to the embodiment of the present invention.

The lid member 2 is provided in the form of a flat plate, as shown in FIG. 3. A pair of hole portions 2a and 2b are provided in the lid member 2, to pass therethrough in the thickness direction (Z direction). These pair of hole portions 2a and 2b are formed at a prescribed interval in the longitudinal direction (Y direction) of the lid member 2, and formed substantially at centers in the short-side direction (X direction) of the lid member 2. The lithium ion battery 1 is so configured that the positive electrode columnar portion 42 described later and a negative electrode columnar portion 52 described later are inserted into the pair of hole portions 2a an 2b from below (from the Z2 side) respectively.

Further, the lithium ion battery 1 includes a positive electrode portion 4 and a negative electrode portion 5 as well as an unshown electrolyte. The positive electrode portion 4 is constituted of a positive electrode 40 in contact with the electrolyte, a collector portion 41 electrically connected to the positive electrode 40, and the positive electrode columnar portion 42 formed on an upper portion of the collector portion 41 to protrude upward (on the Z1 side). The positive electrode 40, the collector portion 41 and the positive electrode columnar portion 42 of the positive electrode portion 4 are all made of Al.

The negative electrode portion 5 is constituted of a negative electrode 50 in contact with the electrolyte, a collector portion 51 electrically connected to the negative electrode 50, and the negative electrode columnar portion 52 formed on an upper portion of the collector portion 51 to protrude upward (on the Z1 side). The negative electrode 50, the collector portion 51 and the negative electrode columnar portion 52 of the negative electrode portion 5 are all made of Cu. An Ni-plated layer 52a (see FIG. 6) is formed on an outwardly exposed portion of the negative electrode columnar portion 52. The negative electrode portion 5 is an example of the "battery negative electrodes" in the present invention.

The positive electrode 40 and the negative electrode 50 are stacked in a rolled manner in a state insulated from each other by a separator 6. The lithium ion battery 1 is so configured that the battery case body 3 and the lid member 2 are welded to each other in a state where the positive electrode portion 4 and the negative electrode portion 5 insulated from each other by the separator 6 and the electrolyte are stored in a storage portion 3a of the battery case body 3. Thus, the lithium ion battery 1 is so configured that the storage portion 3a of the battery case body 3 is closed in a state where the electrolyte is inhibited from leaking out of the space between the lid member 2 and the battery case body 3.

Figure 4:
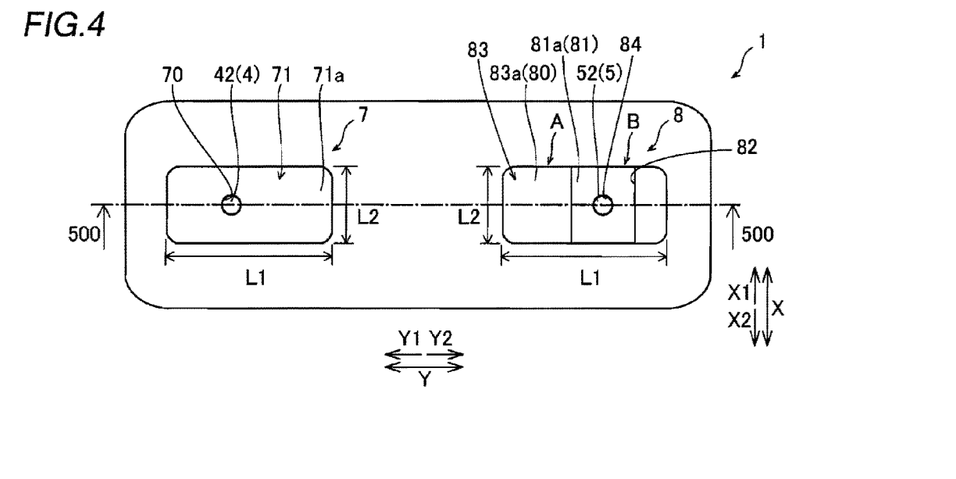
FIG. 4 A top plan view of the lithium ion battery according to the embodiment of the present invention.
Figure 5:
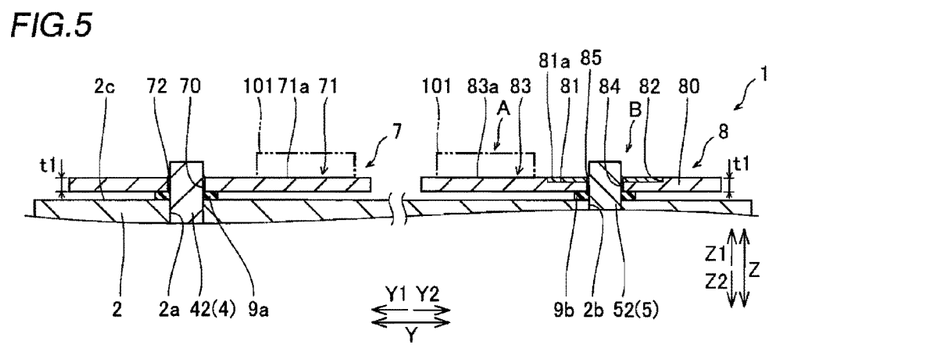
FIG. 5 A sectional view along the line 500-500 in FIG. 4.

As shown in FIG. 3, the positive electrode terminal 7 is arranged on an upper surface 2c (surface on the Z1 side) of the lid member 2 on the Y1 side, while the negative electrode terminal 8 is arranged on the upper surface 2c of the lid member 2 on the Y2 side. Each of the positive electrode terminal 7 and the negative electrode terminal 8 is provided substantially in the form of a flat plate, and subjected to chamfer (R chamfer) working on four corners. As shown in FIG. 4, further, each of the positive electrode terminal 7 and the negative electrode terminal 8 has a length L1 of about 40 mm in the longitudinal direction (Y direction), and has a length L2 of about 20 mm in the short-side direction (X direction). As shown in FIG. 5, the positive electrode terminal 7 and the negative electrode terminal 8 have a thickness t1 of about 1.8 mm in the Z direction. The positive electrode terminal 7 is an example of the "battery terminals" and the "positive electrode terminal for a battery" in the present invention, and the negative electrode terminal 8 is an example of the "battery terminals" and the "negative electrode terminal for a battery" in the present invention.

The positive electrode terminal 7 is made of Al. Further, the positive electrode terminal 7 has a hole portion 70 formed to pass therethrough in the thickness direction (Z direction) on one side (Y1 side) in the longitudinal direction (Y direction) and a bus bar bonding portion 71 arranged on another side (Y2 side), as shown in FIG. 4. The hole portion 70 is formed substantially at the center in the short-side direction (X direction), and so configured that the positive electrode columnar portion 42 of the positive electrode portion 4 is inserted thereinto from below (from the Z2 side), as shown in FIG. 5.

The inner side surface of an upper portion of the hole portion 70 and the positive electrode columnar portion 42 are bonded to each other by laser welding in a state where the positive electrode columnar portion 42 of the positive electrode portion 4 is inserted into the hole portion 70 to be exposed upward (on the Z1 side) beyond the upper surface of the positive electrode terminal 7. Thus, a welded portion 72 mainly made of Al is formed on a bonded portion between the inner side surface of the hole portion 70 on the Z1 side and the positive electrode columnar portion 42.

As shown in FIG. 5, the lithium ion battery 1 is so configured that the flat-plate-shaped bus bar 101 is welded to a planar-surface-shaped upper surface 71a of the bus bar bonding portion 71 by resistance welding.

Figure 6:
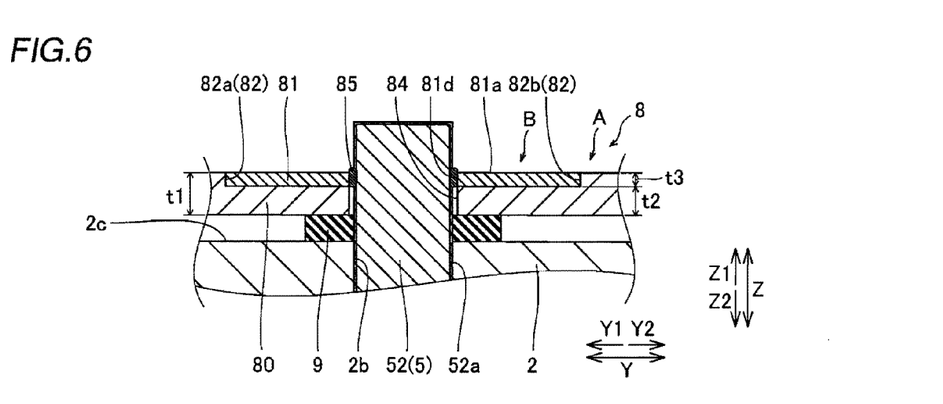
FIG. 6 An enlarged sectional view around a negative electrode terminal along the line 500-500 in FIG. 4.
Figure 7:
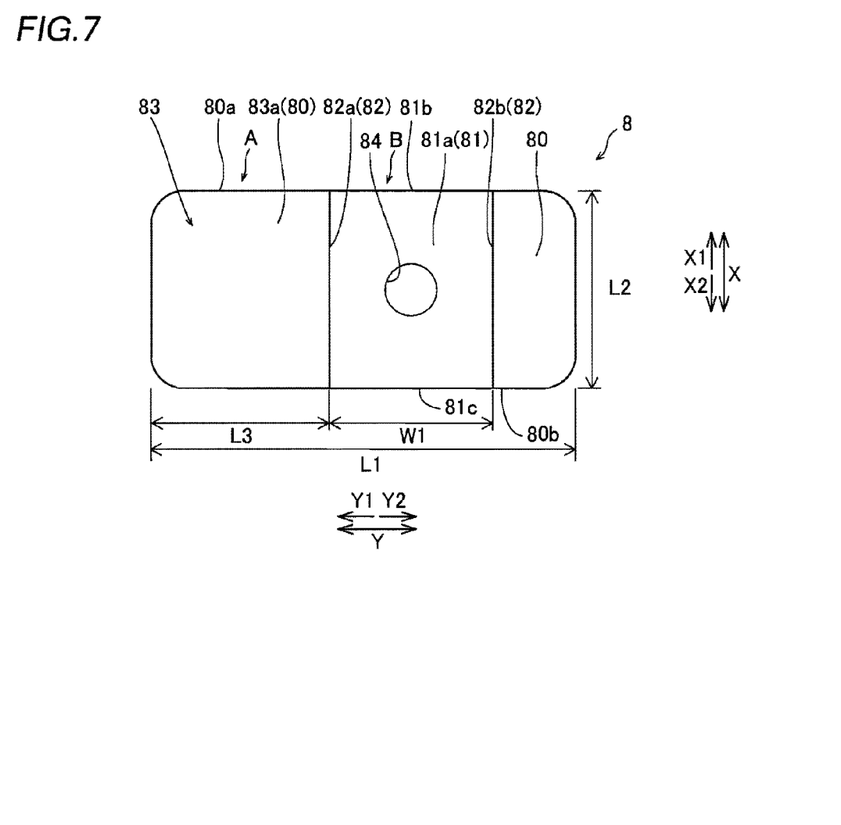
FIG. 7 A top plan view of the negative electrode terminal according to the embodiment of the present invention.

According to this embodiment, the negative electrode terminal 8 is formed by a clad material in which a substrate layer 80 made of Al and a terminal connecting layer 81 made of Ni are bonded to each other, as shown in FIGS. 5 to 7. The substrate layer 80 and the terminal connecting layer 81 are examples of the "first metal layer" and the "second metal layer" in the present invention respectively.

As a specific structure of the negative electrode terminal 8, the substrate layer 80 has a groove portion 82 and a bus bar bonding portion 83, as shown in FIG. 5. The groove portion 82 is so formed that an inner surface 82a on the Y1 side is positioned slightly closer to the Y1 side than a central portion of the substrate layer 80 in the Y direction while an inner side surface 82b on the Y2 side is positioned closer to the Y1 side than an end portion of the substrate layer 80 on the Y2 side, as shown in FIG. 7. The bus bar bonding portion 83 corresponds to a region A, from the inner side surface 82a of the groove portion 82 up to an end portion on the Y1 side, connected with the bus bar 101. The region A is an example of the "first region" in the present invention.

As shown in FIG. 6, the terminal connecting layer 81 is stacked on the substrate layer 80 in a state embedded in the groove portion 82 formed in the substrate layer 80. The substrate layer 80 and the terminal connecting layer 81 are bonded to each other in the state where the terminal connecting layer 81 is embedded in the groove portion 82. In other words, the negative electrode terminal 8 is formed by a clad material having such a shape (inlay (INLAYS) shape) that the terminal connecting layer 81 is not exposed on both end portions of the substrate layer 80 in the Y direction. The groove portion 82 is an example of the "recess portion" in the present invention.

As shown in FIG. 5, the bus bar bonding portion 83 is arranged on the Y1 side of the groove portion 82, and provided on the region A to which the bus bar 101 is welded by resistance welding. The groove portion 82 is formed on an adjacent region B on the same surface side (Z1 side) as the region A of the negative electrode terminal 8 connected with the bus bar 101 in the substrate layer 80. The region B is an example of the "second region" in the present invention.

The upper surface (surface on the Z1 side) of the substrate layer 80 on the X1 side and the X2 side of the groove portion 82 and an upper surface 81a of the terminal connecting layer 81 are both exposed upward (on the Z1 side), and connected with each other to be substantially in the form of planar surfaces. In other words, the upper surface 81a of the terminal connecting layer 81 and an upper surface 83a of the bus bar bonding portion 83 are both exposed upward (on the Z1 side), and connected with each other to be substantially in the form of planar surfaces having no step on the boundary portion (connected portion).

As shown in FIG. 6, the thickness t2 of the substrate layer 80 is about 1.3 mm and the thickness t3 of the terminal connecting layer 81 is about 0.5 mm in the region B. In other words, the thickness t3 (about 0.5 mm) of the terminal connecting layer 81 is smaller than the thickness t2 (about 1.3 mm) of the substrate layer 80. The thickness t3 (about 0.5 mm) of the terminal connecting layer 81 has a magnitude of about 28% of the thickness t1 (about 1.8 mm, the sum of the thicknesses t2 and t3) of the negative electrode terminal 8.

As shown in FIG. 7, the groove portion 82 is formed to extend in the X direction from an end portion 80a of the substrate layer 80 on the X1 side up to an end portion 80b on the X2 side, while the terminal connecting layer 81 is embedded in the groove portion 82 to extend in the X direction from an end portion 81b on the X1 side up to an end portion 81c on the X2 side. In other words, the groove portion 82 and the terminal connecting layer 81 both have the length L2 of about 20 mm in the X direction. Further, the groove portion 82 and the terminal connecting layer 81 both have a width W1 of about 15 mm in the Y direction. In other words, the width W1 (about 15 mm) of the groove portion 82 and the terminal connecting layer 81 in the Y direction is not more than half (about 20 mm) of the length L1 (about 40 mm) of the negative electrode terminal 8 in the Y direction. The X direction is an example of the "second direction" in the present invention.

The bus bar bonding portion 83 is arranged on the region A consisting of only the substrate layer 80 on the Y1 side of the groove portion 82 in the negative electrode terminal 8. Further, the bus bar bonding portion 83 has a length L3 of about 15 mm in the Y direction. As shown in FIG. 5, the lithium ion battery 1 is so configured that the flat-plate-shaped bus bar 101 is welded to the planar-surface-shaped upper surface 83a of the bus bar bonding portion 83 by resistance welding.

As shown in FIGS. 6 and 7, the negative electrode terminal 8 has a hole portion 84 formed to pass therethrough in the thickness direction (Z direction) on one side (Y2 side) in the longitudinal direction (Y direction). This hole portion 84 is formed on the region B, and formed substantially at the center in the short-side direction (X direction, see FIG. 7). The hole portion 84 is so configured that the negative electrode columnar portion 52 of the negative electrode portion 5 is inserted thereinto from below (from the Z2 side), as shown in FIG. 6. The Y direction is an example of the "first direction" in the present invention.

According to this embodiment, the hole portion 84 is formed to pass through the substrate layer 80 arranged on the Z2 side and the terminal connecting layer 81 arranged on the Z1 side in the region B. In other words, the lithium ion battery 1 is so configured that the terminal connecting layer 81 is positioned on the Z1 side in the inner side surface of the hole portion 84 and the substrate layer 80 is positioned on the Z2 side. The inner side surface of the hole portion 84 and the negative electrode columnar portion 52 are welded to each other by laser welding in a state where the negative electrode columnar portion 52 of the negative electrode portion 5 is inserted into the hole portion 84 to be exposed upward (on the Z1 side) beyond the upper surface 81a of the terminal connecting layer 81. More specifically, the inner side surface 81d of the hole portion 84 constituted of the terminal connecting layer 81 and the Ni-plated layer 52a of the negative electrode columnar portion 52 are welded to each other. Thus, a welded portion 85 mainly made of Ni is formed on the welded portion between the inner side surface 81d of the terminal connecting layer 81 and the Ni-plated layer 52a of the negative electrode columnar portion 52.

As shown in FIG. 5, ring-shaped packings 9a and 9b are arranged between the positive and negative electrode terminals 7 and 8 and the lid member 2 respectively. These packings 9a and 9b are made of a material having insulativity, and arranged to inhibit the positive and negative electrode terminals 7 and 8 and the lid member 2 from coming into contact with each other. Thus, the lithium ion battery 1 is so configured that the positive and negative electrode terminals 7 and 8 and the upper surface 2c of the lid member 2 are insulated from each other. The positive electrode columnar portion 42 and the negative electrode columnar portion 52 are inserted into hole portions of the packings 9a and 9b respectively.

A production process for the lithium ion battery 1 according to the embodiment of the present invention and a production process for the lithium ion battery assembly 100 are now described with reference to FIGS. 1 to 3 and 5 to 8.

First, an Al plate 280 made of Al having a thickness of about 4 mm is prepared. This Al plate 280 has a width of about 60 mm in the short-side direction (Y direction), and is formed to extend in the longitudinal direction (X direction). The Al plate 280 is wound in the X direction in a rolled manner. Then, the groove portion 82 (see FIG. 8) having the width of about 15 mm in the Y direction and a depth of about 1.3 mm in the thickness direction is formed in a prescribed region of the Al plate 180 to extend in the X direction by cutting.

Further, an Ni plate 281 made of Ni having a thickness of about 2 mm is prepared. This Ni plate 281 has a width of about 15 mm in the short-side direction (Y direction), and is formed to extend in the longitudinal direction (X direction). The Ni plate 281 is wound in the X direction in a rolled manner. Then, the Ni plate 281 is embedded in the groove portion 82 of the Al plate 280 along the X direction, so that both end portions in the Y direction are not exposed. Then, prescribed pressure is applied to the Al plate 280 and the Ni plate 281, thereby bonding the Al plate 280 and the Ni plate 281 to each other. At this time, the Al plate 280 and the Ni plate 281 are bonded to each other while pressing the upper surface of the Al plate 280 positioned on one side (Y1 side) of the groove portion 82 in the Y direction and the upper surface of the Al plate 280 positioned on another side (Y2 side) in the Y direction.

Figure 8:
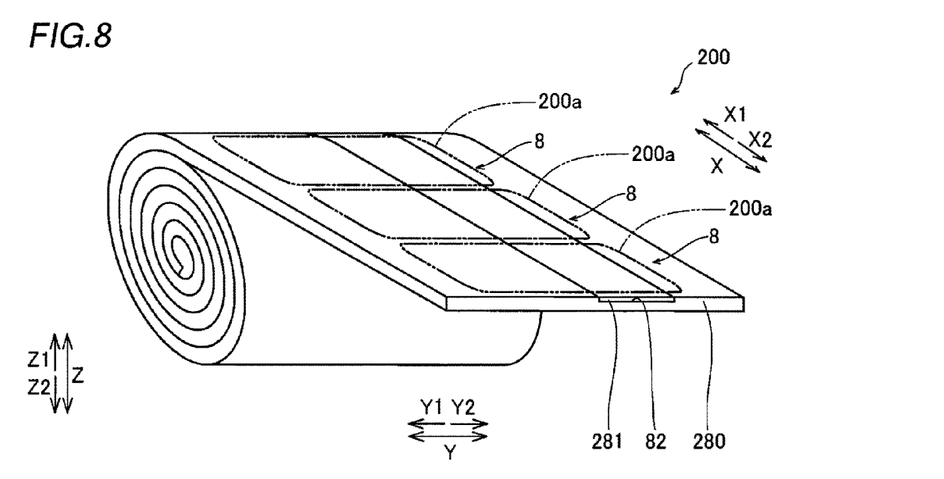
FIG. 8 A perspective view for illustrating a production process for the negative electrode terminal according to the embodiment of the present invention.

Thereafter a temperature of about 580° C. is applied to a jointing material of the Al plate 280 and the Ni plate 281 in the range of at least about 10 seconds and not more than about 3 minutes. Thereafter diffusion annealing is performed by gradually cooling the jointing material of the Al plate 280 and the Ni plate 281. Then, pressure is applied to the heat-treated jointing material of the Al plate 280 and the Ni plate 281 again, whereby a clad material 200 in which the Al plate 280 and the striped Ni plate 281 are bonded to each other is formed in a state where the terminal connecting layer 81 is embedded in the groove portion 82 extending in the X direction along the X direction, as shown in FIG. 8. This clad material 200 extends in the longitudinal direction (X direction), and is wound in the X direction in a rolled manner.

In the clad material 200, the thickness t2 (see FIG. 6) of the Al plate 280 (substrate layer 80) becomes about 1.3 mm and the thickness t3 (see FIG. 6) of the Ni plate 281 (terminal connecting layer 81) becomes about 0.5 mm in the region B of the Al plate 280 corresponding to the groove portion 82 to which the Ni plate 281 is bonded.

Thereafter a plurality of negative electrode terminals 8 are punched out of the clad material 200 by press working. At this time, the negative electrode terminals 8 are punched out along punching lines 200a, to have the length L1 (see FIG. 7) of about 40 mm in the Y direction and to have the length L2 (see FIG. 7) of about 20 mm in the X direction. At this time, the plurality of negative electrode terminals 8 are punched out of the clad material 200 in a state separating from each other at prescribed intervals in the X direction. At the same time, the hole portion 84 is formed to pass through the substrate layer 80 and the terminal connecting layer 81. Thus, the negative electrode terminal 8 including the substrate layer 80 and the terminal connecting layer 81 formed to extend from the end portion 81b on the X1 side up to the end portion 81c on the X2 side in the X direction and having the hole portion 84 formed in the region B is plurally formed from the rolled clad material 200, as shown in FIG. 7.

Then, the negative electrode terminal 8 and the negative electrode columnar portion 52 of the negative electrode portion 5 are welded to each other in a state of arranging the negative electrode terminal 8 on the upper surface of the lid member 2 on the Y2 side through the packing 9b. More specifically, the negative electrode columnar portion 52 exposed from the hole portion 2b of the lid member 2 is inserted into the hole portion 84 of the negative electrode terminal 8 to be exposed upward (on the Z1 side) beyond the upper surface 81a of the terminal connecting layer 81 of the negative electrode terminal 8 after being passed through the hole portion of the packing 9b, as shown in FIG. 6. Then, the inner side surface 81d of the hole portion 84 constituted of the terminal connecting layer 81 on the Z1 side and the negative electrode columnar portion 52 are welded to each other by laser welding. Thus, the welded portion 85 mainly made of Ni is formed on the welded portion between the terminal connecting layer 81 and the Ni-plated layer 52a of the negative electrode columnar portion 52, and the negative electrode terminal 8 and the negative electrode portion 5 are connected with each other.

As shown in FIG. 5, the positive electrode terminal 7, made of Al, having the hole portion 70 is prepared. Similarly to the negative electrode terminal 8 and the negative electrode columnar portion 52 of the negative electrode portion 5, the positive electrode terminal 7 made of Al and the positive electrode columnar portion 42 of the positive electrode portion 4 are welded to each other in a state of arranging the positive electrode terminal 7 on the upper surface of the lid member 2 on the Y1 side through the packing 9a. Thus, the welded portion 72 mainly made of Al is formed on a welded portion between the inner side surface of the hole portion 70 on the Z1 side and the positive electrode columnar portion 42, and the positive electrode terminal 7 and the positive electrode terminal 4 are connected with each other. Thereafter the battery case body 3 and the lid member 2 are welded to each other in the state of storing the positive electrode portion 4 and the negative electrode portion 5 insulated from each other by the separator 6 and the electrolyte in the storage portion 3a of the battery case body 3, as shown in FIG. 3. Thus, the lithium ion battery 1 shown in FIG. 2 is produced.

Thereafter a plurality of lithium ion batteries 1 are arranged along the X direction, as shown in FIG. 1. Then, the positive electrode terminal 7 in the bus bar bonding portion 71 of the prescribed lithium ion battery 1 and one end of the bus bar 101 in the X direction are resistance-welded to each other, while the substrate layer 80 of the negative electrode terminal 8 in the bus bar bonding portion 83 of the lithium ion battery 1 adjacent to the prescribed lithium ion battery 1 and another end of the bus bar 101 in the X direction are resistance-welded to each other. At this time, the planar-surface-shaped upper surface 71a of the bus bar bonding portion 71 and the flat-plate-shaped bus bar 101 are welded to each other, while the planar-surface-shaped upper surface 83a of the bus bar bonding portion 83 and the flat-plate-shaped bus bar 101 are welded to each other. Thus, the bus bar bonding portion 71 of the positive electrode terminal 7 and the bus bar 101 are welded to each other through a bonded portion (not shown) made of Al. Further, the bus bar bonding portion 83 of the negative electrode terminal 8 and the bus bar 101 are welded to each other through a bonded portion (not shown) made of Al.

Thus, the lithium ion battery assembly 100 shown in FIG. 1, in which the plurality of lithium ion batteries 1 are connected in series with each other by the plurality of bus bars 101 made of Al, is produced.

According to this embodiment, as hereinabove described, the terminal connecting layer 81 made of Ni is arranged to be stacked on the substrate layer 80 in the region B of the substrate layer 80 including the region A connected with the bus bar 101 and the adjacent region B on the same surface side (Z1 side) as the region A so that the terminal connecting layer 81 is not arranged on the region A connected with the bus bar 101, whereby heat at the time when the negative electrode terminal 8 and the bus bar 101 are connected with each other can be inhibited from reaching the interface between the substrate layer 80 and the terminal connecting layer 81. Thus, an intermetallic compound containing Al and Ni can be inhibited from being formed on the interface between the substrate layer 80 and the terminal connecting layer 81, whereby bonding strength between the substrate layer 80 and the terminal connecting layer 81 can be inhibited from lowering. Consequently, the substrate layer 80 and the terminal connecting layer 81 can be inhibited from coming off each other.

According to this embodiment, as hereinabove described, the positive electrode terminals 7 and the negative electrode terminals 8 of the plurality of lithium ion batteries 1 can be electrically connected with each other by employing the bus bars 101 made of Al, when configuring the planar-surface-shaped upper surfaces 83a of the bus bar bonding portions 83 made of Al so that the flat-plate-shaped bus bars 101 made of Al are welded thereto by resistance welding. At this time, Al is lighter in weight than Cu or Ni which is the material for the general bus bars 101, whereby the weight of the lithium ion battery assembly 100 can be reduced.

According to this embodiment, as hereinabove described, a fragile intermetallic compound containing Al and Cu can be inhibited from being formed on a connected portion when welding the inner side surface 81d of the hole portion 84 constituted of the terminal connecting layer 81 made of Ni and the Ni-plated layer 52a of the negative electrode columnar portion 52 to each other, dissimilarly to a case of connecting the substrate layer 80 made of Al to the negative electrode columnar portion 52. Thus, the negative electrode terminal 8 and the negative electrode portion 5 can be strongly connected with each other.

Cu constituting a general bus bar is a material unsuitable for welding, due to such a point that a fragile oxide is formed by oxidation, such a point that electrical resistance is small, and such a point that the same easily reflects light. Generally in a case of welding Cu, therefore, plating must be performed with Ni. Further, Cu is lower in corrosion resistance than Al, and hence plating must be performed with Ni, also from an aspect of improvement in corrosion resistance. According to this embodiment, on the other hand, the bus bar 101 may not be plated with Ni when resistance-welding the substrate layer 80, made of Al, of the negative electrode terminal 8 in the bus bar bonding portion 83 and the bus bar 101 made of Al to each other in the bus bar bonding portion 83 as hereinabove described, as compared with a case of employing a bus bar made of Cu, whereby the negative electrode portion 5 and the negative electrode terminal 8 can be easily connected with each other.

According to this embodiment, as hereinabove described, an energized welded portion can be made to generate more heat than a case of employing a bus bar made of Cu when resistance-welding the substrate layer 80, made of Al, of the negative electrode terminal 8 in the bus bar bonding portion 83 and the bus bar 101 made of Al to each other in the bus bar bonding portion 83, since Al is larger in electrical resistance as compared with Cu. Thus, the welded portion between the bus bar bonding portion 83 and the bus bar 101 can be easily melted, whereby the negative electrode terminal 8 and the bus bar 101 can be more easily connected with each other. Further, Al is smaller in specific gravity as compared with Cu and Ni, whereby the lithium ion battery assembly 100 can be rendered more lightweight as compared with a case of employing a bus bar made of Cu or Ni, when employing Al for the bus bar 101.

According to this embodiment, as hereinabove described, the bus bar 101 can be easily connected to the substrate layer 80 (bus bar bonding portion 83) from above while the negative electrode columnar portion 52 of the negative electrode portion 5 can be easily connected to the terminal connecting layer 81 when arranging the substrate layer 80 made of Al and the terminal connecting layer 81 made of Ni both upward (on the Z1 side).

According to this embodiment, as hereinabove described, positioning of the terminal connecting layer 81 embedded in the groove portion 82 can be easily performed due to the groove portion 82 of the substrate layer 80 when forming the groove portion 82 in the region B of the substrate layer 80 and bonding the terminal connecting layer 81 to the substrate layer 80 in the state embedded in the groove portion 82 of the substrate layer 80.

According to this embodiment, as hereinabove described, not only the upper surface of the Al plate 280 positioned on one side (Y1 side) but also the upper surface of the Al plate 280 positioned on another side (Y2 side) can be pressed at the time of forming the clad material 200 when configuring the negative electrode terminal 8 to be formed by a clad material having such a shape (inlay shape) that the terminal connecting layer 81 is not exposed on both end portions of the substrate layer 80 in the Y direction, as compared with a case where a negative electrode terminal is formed by a clad material having such a shape (edgelay (EDGELAYS) shape) that an end surface of a terminal connecting layer is exposed. Thus, the clad material 200 in which the substrate layer 80 and the terminal connecting layer 81 are bonded to each other can be easily formed. Further, a pair of inner side surfaces of the groove portion 82 of the substrate layer 80 and both end surfaces of the terminal connecting layer 81 in the Y direction can be bonded to each other respectively, whereby the bonding strength between the substrate layer 80 and the terminal connecting layer 81 can be improved as compared with a clad material having an edgelay shape bonding only one side.

According to this embodiment, a plurality of negative terminals 8 having groove portions 82 and chamfered shapes, in which substrate layers 80 made of Al and terminal connecting layers 81 made of Ni are bonded to each other can be easily obtained from one clad material 200 by forming the clad material 200 provided with the Al plate 280 and the striped Ni plate 281 to extend in the X direction and punching out the negative electrode terminals 8 in the state separating from each other at prescribed intervals in the X direction, when forming the groove portion 82 to extend in the X direction from the end portion 80a of the substrate layer 80 on the X1 side up to the end portion 80b on the X2 side and configuring the terminal connecting layer 81 to be embedded in the groove portion 82 so as to extend in the X direction from the end portion 81b on the X1 side up to the end portion 81c on the X2 side.

According to this embodiment, as hereinabove described, the bus bar bonding portion 83 can be sufficiently ensured in the substrate layer 80 when configuring the lithium ion battery 1 so that the width W1 (about 15 mm) of the groove portion 82 and the terminal connecting layer 81 in the Y direction is not more than half (about 20 mm) of the length L1 (about 40 mm) of the negative electrode terminal 8 in the Y direction, whereby the substrate layer 80 and the bus bar 101 can be easily connected with each other.

According to this embodiment, as hereinabove described, foreign matter is inhibited from coming into contact with or getting caught by the connected portion (inner side surface 82a of the groove portion 82) between the substrate layer 80 and the terminal connecting layer 81 when connecting the upper surface 81a of the terminal connecting layer 81 and the upper surface 83a of the bus bar bonding portion 83 with each other to be substantially in the form of planar surfaces having no step on the boundary portion (connected portion), dissimilarly to a case where uneven shapes are formed by the bus bar bonding portion 83 (substrate layer 80) and the terminal connecting layer 81. Thus, the substrate layer 80 and the terminal connecting layer 81 can be inhibited from coming off each other from the connected portion, serving as a starting point, between the substrate layer 80 and the terminal connecting layer 81.

According to this embodiment, as hereinabove described, the negative electrode portion 5 inserted into the hole portion 84 and the terminal connecting layer 81 can be easily electrically connected with each other when forming the hole portion 84 in the region B to pass through the substrate layer 80 arranged on the Z2 side and the terminal connecting layer 81 arranged on the Z1 side.

According to this embodiment, as hereinabove described, the negative electrode portion 5 inserted into the hole portion 84 and the terminal connecting layer 81 can be more reliably electrically connected with each other by welding the inner side surface 81d of the terminal connecting layer 81 and the negative electrode columnar portion 52 of the negative electrode portion 5 inserted into the hole portion 84 to each other when welding the inner side surface 81d of the hole portion 84 constituted of the terminal connecting layer 81 and the negative electrode columnar portion 52 to each other.

According to this embodiment, as hereinabove described, the electrical resistance and the weight of the negative electrode terminal 8 formed by the clad material of the substrate layer 80 and the terminal connecting layer 81 can be inhibited from increasing by setting the thickness t3 of the terminal connecting layer 81 made of Ni larger in electrical resistance and weight (specific gravity) per unit volume than Al to not more than the thickness t2 of the substrate layer 80 made of Al when reducing the thickness t3 (about 0.5 mm) of the terminal connecting layer 81 below the thickness t2 (about 1.3 mm) of the substrate layer 80 and setting the same to a magnitude of about 28% of the thickness t1 (about 1.8 mm, the sum of the thicknesses t2 and t3) of the negative electrode terminal 8.

According to this embodiment, as hereinabove described, a short circuit between the negative electrode terminal 8 and the lid member 2 can be prevented when insulating the positive and negative electrode terminals 7 and 8 and the upper surface 2c of the lid member 2, by employing the packings 9a and 9b.

According to this embodiment, as hereinabove described, the substrate layer 80 in the form of a planar surface and the bus bar 101 in the form of a flat plate can be easily welded to each other when welding the flat-plate-shaped bus bar 101 to the planar-surface-shaped upper surface 83a of the bus bar bonding portion 83 by resistance welding.

According to this embodiment, as hereinabove described, the weight of the lithium ion battery assembly 100 constituted of the plurality of lithium ion batteries 1 and the plurality of bus bars 101 connecting the respective lithium ion batteries 1 with each other can be more reduced when configuring the substrate layer 80 of the negative electrode terminal 8 to be made of Al identically to the positive electrode terminal 7 and the bus bar 101 made of Al. Further, Al and Al are connected with each other, whereby contact resistance between the substrate layer 80 and the bus bar 101 and contact resistance between the positive electrode terminal 7 and the bus bar 101 can be both reduced.

The embodiment disclosed this time must be considered as illustrative in all points and not restrictive. The range of the present invention is shown not by the above description of the embodiment but by the scope of claims for patent, and all modifications in the meaning and range equivalent to the scope of claims for patent are included.

Figure 9:
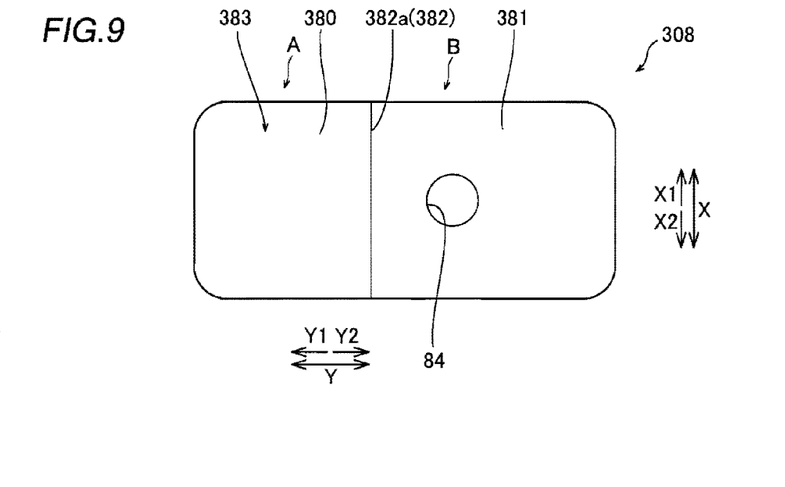
FIG. 9 A top plan view of a negative electrode terminal according to a first modification of the present invention.

For example, while such an example that the negative terminal 8 is formed by the clad material having such a shape (inlay shape) that the terminal connecting layer 81 is not exposed on both end portions of the substrate layer 80 in the Y direction has been shown in the aforementioned embodiment, the present invention is not restricted to this. According to the present invention, a negative electrode terminal 308 may be configured to be formed by a clad material having a shape (edgelay shape) of not exposing a terminal connecting layer 381 on an end portion of a substrate layer 380 on a Y1 side while exposing the same on an end portion on a Y2 side, as in a first modification shown in FIG. 9. At this time, a notch portion 382 having an inner side surface 382a on the Y1 side while having no inner side surface on the Y2 side may be formed on the substrate layer 380, in place of the groove portion 82 in the aforementioned embodiment. Thus, a mask for the substrate layer 380 may be formed only on one side (Y1 side) of the terminal connecting layer 381 in a case of forming the mask on the surface of the substrate layer 380 and working only the surface of the terminal connecting layer 381, for example, as compared with a clad material of an inlay shape, whereby it is possible to easily work only the surface of the terminal connecting layer 381. The negative electrode terminal 308 is an example of the "negative electrode terminal for a battery" in the present invention. The substrate layer 380 and the terminal connecting layer 381 are examples of the "first metal layer" and the "second metal layer" in the present invention respectively, and the notch portion 382 is an example of the "recess portion" in the present invention.

Figure 10:
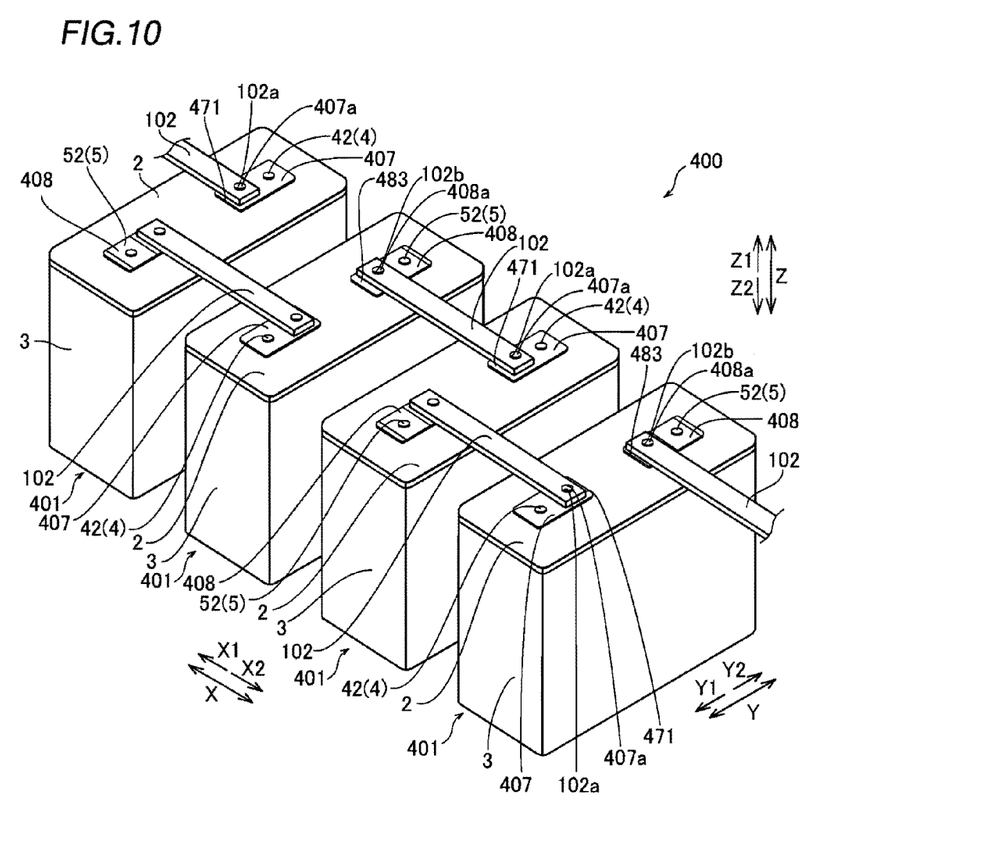
FIG. 10 A perspective view showing a lithium ion battery assembly according to a second modification of the present invention.

While such an example that the flat-plate-shaped bus bar 101 is welded to the planar-surface-shaped bus bar bonding portion 71 of the positive electrode terminal 7 by resistance welding and the flat-shaped bus bar 101 is welded to the planar-surface-shaped bus bar bonding portion 83 of the negative electrode terminal 8 by resistance welding has been shown in the aforementioned embodiment, the present invention is not restricted to this. According to the present invention, protrusions 407a and 408a may be formed on bus bar bonding portions 471 of positive electrode terminals 407 of lithium ion batteries 401 and bus bar bonding portions 483 formed by substrate layers 80 (see FIG. 5) of negative electrode terminals 408 respectively while hole portions 102a and 102b into which the protrusions 407a and 408a are inserted respectively may be formed in bus bars 102, as in a lithium ion battery assembly 100 according to a second modification shown in FIG. 10. Thus, it becomes possible to easily perform positioning of the positive electrode terminals 407 and the bus bars 102 due to the protrusions 407a and the hole portions 102a, whereby it is possible to reliably connect the bus bars 102 and the positive electrode terminals 407 with each other. Similarly, it becomes possible to easily perform positioning of the negative electrode terminals 408 and the bus bars 102 due to the protrusions 408a and the hole portions 102b, whereby it is possible to reliably connect the bus bars 102 and the substrate layers 80 of the negative electrode terminals 408 with each other. The lithium ion batteries 401 are examples of the "batteries" in the present invention, and the bus bars 102 are examples of the "battery terminal connecting plate" in the present invention. The positive electrode terminals 407 are examples of the "battery terminals" and the "positive electrode terminal for a battery" in the present invention, and the negative electrode terminals 408 are examples of the "battery terminals" and the "negative electrode terminal for a battery" in the present invention.

While the example of reducing the thickness t3 (about 0.5 mm) of the terminal connecting layer 81 below the thickness t2 (about 1.3 mm) of the substrate layer 80 and setting the same to the magnitude of about 28% of the thickness t1 (about 1.8 mm, the sum of the thicknesses t2 and t3) of the negative electrode terminal 8 has been shown in the aforementioned embodiment, the present invention is not restricted to this. According to the present invention, the thickness t3 of the terminal connecting layer 81 may be a magnitude of less than about 28% of the thickness t1 of the negative electrode terminal 8. At this time, the thickness t3 of the terminal connecting layer 81 is preferably a magnitude of at least about 10% of the thickness t1 of the negative electrode terminal 8, in order to ensure bonding strength between the inner side surface 81d of the hole portion 84 constituted of the terminal connecting layer 81 and the negative electrode columnar portion 52. The thickness t3 of the terminal connecting layer 81 may be larger than about 28% of the thickness t1 of the negative electrode terminal 8.

At this time, the thickness t3 of the terminal connecting layer 81 is preferably a magnitude of not less than about 50% of the thickness t1 of the negative electrode terminal 8, with objects of reducing the weight of the negative electrode terminal 8 and reducing the electrical resistance of the negative electrode terminal 8. In other words, the thickness t3 of the terminal connecting layer 81 is preferably not more than the thickness t2 of the substrate layer 80.

While the example of connecting the substrate layer 80, made of Al, of the negative electrode terminal 8 and the bus bar 101 made of Al to each other by resistance welding has been shown in the aforementioned embodiment, the present invention is not restricted to this. According to the present invention, the substrate layer 80, made of Al, of the negative electrode terminal 8 and the bus bar 101 made of Al may be connected with each other by laser welding. In this case, it is possible to make the bus bar 101 and the substrate layer 80 to generate more heat, since Al is smaller in light reflection as compared with Cu and absorbs a large quantity of a laser beam. Thus, it is possible to easily melt the welded portion between the bus bar 101 and the substrate layer 80, whereby it is possible to more easily connect the bus bar 101 and the negative electrode terminal 8 with each other as compared with a case of employing a bus bar made of Cu.

While the example of connecting the substrate layer 80, made of Al, of the negative electrode terminal 8 and the bus bar 101 made of Al with each other by resistance welding has been shown in the aforementioned embodiment, the present invention is not restricted to this. According to the present invention, the substrate layer 80, made of Al, of the negative electrode terminal 8 and the bus bar 101 made of Al may be connected with each other by TIG (Tangsten Inert Gas) welding. At this time, heat in welding is more easily applied to the substrate layer 80 in the TIG welding, as compared with the resistance welding in which heat is locally applied. Therefore, it is possible to more remarkably attain such an effect of the present invention that the substrate layer 80 and the terminal connecting layer 81 can be inhibited from coming off each other by arranging the terminal connecting layer 81, made of Ni, of the negative electrode terminal 8 to be stacked on the substrate layer 80 in the region B of the substrate layer 80.

While the example of connecting the inner side surface 81d of the hole portion 84 on the Z1 side and the negative electrode columnar portion 52 with each other by laser welding has been shown in the aforementioned embodiment, the present invention is not restricted to this. According to the present invention, the inner side surface 81d of the hole portion 84 on the Z1 side and the negative electrode columnar portion 52 may be connected with each other by resistance welding or ultrasonic welding.

While such an example that the positive electrode terminal 7, the substrate layer 80 of the negative electrode terminal 8 and the bus bar 101 are all made of Al has been shown in the aforementioned embodiment, the present invention is not restricted to this. According to the present invention, the positive electrode terminal 7, the substrate layer 80 of the negative electrode terminal 8 and the bus bar 101 may be configured to be made of Al alloys.

While such an example that the terminal connecting layer 81 of the negative electrode terminal 8 is made of Ni has been shown in the aforementioned embodiment, the present invention is not restricted to this. According to the present invention, the terminal connecting layer 81 of the negative electrode terminal 8 may be configured to be made of an Ni alloy.

While the example of forming the lid member 2 and the battery case body 3 both by Ni-plated steel plates has been shown in the aforementioned embodiment, the present invention is not restricted to this. According to the present invention, the lithium ion battery 1 may be structured to use the lid member 2 and the battery case body 3 as positive electrodes by configuring the lid member 2 and the battery case body 3 to be both made of Al. At this time, the bus bar 101 is connected to arbitrary positions of the lid member 2 and the battery case body 3. Thus, it is possible to render the lithium ion battery assembly 100 lightweight, since Al is smaller in specific gravity than an Ni-plated steel plate. Further, the positive electrode terminal 7 and the packing 9a become unnecessary, whereby it is possible to reduce the number of components.

While the example of connecting the upper surface 81a of the terminal connecting layer 81 and the upper surface 83a of the bus bar bonding portion 83 with each other to be substantially in the form of planar surfaces has been shown in the aforementioned embodiment, the present invention is not restricted to this. According to the present invention, the upper surface 81a and the upper surface 83a may be connected with each other so that the upper surface 81a of the terminal connecting layer 81 projects upward beyond the upper surface 83a of the bus bar bonding portion 83, or the upper surface 81a and the upper surface 83a may be connected with each other so that the upper surface 81a is concaved downward.

While the example of connecting the bus bar 101 and the positive electrode portion 4 or the negative electrode portion 5 to the positive electrode terminal 7 and the negative electrode terminal 8 of the lithium ion battery 1 has been shown in the aforementioned embodiment, the present invention is not restricted to this. For example, wires may be further connected to the respective ones of the positive electrode terminal 7 and the negative electrode terminal 8 of the lithium ion battery 1, in order to measure a power generating state or the like of the lithium ion battery 1. Thus, it becomes possible to measure and grasp circumstances such as the degree of deterioration of the lithium ion battery 1, whereby it becomes possible to adjust the charge/discharge quantity in each lithium ion battery 1.

While such an example that the plurality of lithium ion batteries 1 are connected in series with each other in the lithium ion battery assembly 100 has been shown in the aforementioned embodiment, the present invention is not restricted to this. According to the present invention, the plurality of lithium ion batteries 1 may be partially or entirely connected in parallel with each other in the lithium ion battery assembly 100.

The invention claimed is:

1. A negative electrode terminal (8) for a battery configured to be connectable to a battery terminal connecting plate (101, 102) for connecting battery terminals (7, 8) of a plurality of batteries (1) with each other and battery negative electrodes (5) of the batteries and to be arrangeable on upper surfaces of lids (2) of battery cases of the batteries,
composed of a clad material formed by bonding:
a first metal layer (80), made of Al or an Al alloy, including a first region connected with the battery terminal connecting plate and an adjacent second region on the same surface side as the first region; and
a second metal layer (81), made of Ni or an Ni alloy, connected with the battery negative electrodes, wherein the second metal layer is arranged to be stacked on the first metal layer in the second region of the first metal layer in a stacking direction in which the battery negative electrodes extend, the first metal layer made of Al or Al alloy is configured to be connectable to the battery terminal connecting plate made of Al or an Al alloy in the first region, and the second metal layer made of Ni or Ni alloy is configured to be connectable to the battery negative electrodes made of Cu or a Cu alloy in the second region, and a hole portion passing through the first metal layer and the second metal layer is formed in the second region, and the negative electrode terminal for a battery is so configured that the battery negative electrodes inserted into the hole portion are connectable to at least the inner peripheral surface of the second metal layer.

2. The negative electrode terminal for a battery according to claim 1, wherein the first metal layer and the second metal layer are arranged on the same surface side, opposite to the batteries, of the negative electrode terminal for a battery.

3. The negative electrode terminal for a battery according to claim 2, wherein the second metal layer stacked on the first metal layer is connected with the battery negative electrodes in the second region of the first metal layer, a recess portion (82) is formed in the second region of the first metal layer, and the second metal layer is bonded to the first metal layer in a state embedded in the recess portion of the first metal layer.

4. The negative electrode terminal for a battery according to claim 3, wherein the recess portion of the first metal layer is formed to extend from one end portion up to another end portion in a second direction orthogonal to a first direction, in which the first region and the second region are adjacent to each other, in the second region, and the second metal layer is embedded in the recess portion of the first metal layer to extend from one end portion up to another end portion in the second direction.

5. The negative electrode terminal for a battery according to claim 3, wherein the recess portion is the groove portion (82), and the second metal layer is embedded in the groove portion of the first metal layer to extend from one end portion up to another end portion in the second direction in a state where both end surfaces in the first direction are not exposed.

6. The negative electrode terminal for a battery according to claim 5, wherein the width of the groove portion of the first metal layer in the first direction is not more than half of the length of the first metal layer in the first direction.

7. The negative electrode terminal for a battery according to claim 3, wherein the recess portion is a notch portion (382), and the second metal layer is bonded to the notch portion of the first metal layer to extend from one end portion up to another end portion in the second direction in a state where one end surface in the first direction is exposed.

8. The negative electrode terminal for a battery according to claim 2, wherein the first metal layer in the first region and the second metal layer stacked on the first metal layer in the second region are adjacently provided in the form of planar surfaces.

9. The negative electrode terminal for a battery according to claim 1, wherein the thickness of the second metal layer is not more than the thickness of the first metal layer in the second region.

10. The negative electrode terminal for a battery according to claim 9, wherein the thickness of the second metal layer is at least 10% and not more than 50% of the total thickness of the first metal layer and the second metal layer in the second region.

11. The negative electrode terminal for a battery according to claim 1, wherein the clad material constituting the negative electrode terminal for a battery is configured to be arrangeable on the upper surfaces of the lids of the battery cases in a state insulated from the lids of the battery cases.

12. The negative electrode terminal for a battery according to claim 1, wherein at least part of the first metal layer in the first region is provided in the form of a planar surface to be weldable to the battery terminal connecting plate in the form of a flat plate.

13. The negative electrode terminal for a battery according to claim 1, wherein the first metal layer includes a protrusive portion (408*a*) formed on the first region and engageable with the battery terminal connecting plate.

14. The negative electrode terminal for a battery according to claim 1, wherein the first metal layer is connectable with battery positive electrodes (4) of the batteries (1), and made of the same metallic material as a positive electrode terminal (7) for a battery, made of Al or an Al alloy, connected with the battery terminal connecting plate.

15. A method for producing a negative electrode terminal (8) for a battery configured to be connectable to a battery terminal connecting plate (101, 102) for connecting battery terminals (7, 8) of a plurality of batteries (1) with each other and battery negative electrodes (5) of the batteries and to be arrangeable on upper surfaces of lids (2) of battery cases of the batteries, comprising steps of:

preparing a first metal material (280), extending in a prescribed direction, capable of plurally forming a first metal layer (80), made of Al or an Al alloy, including a first region connected with the battery terminal connecting plate and an adjacent second region on the same surface side as the first region;

preparing a second metal material (281), extending in the prescribed direction, capable of plurally forming a second metal layer (81), made of Ni or an Ni alloy, connected with the battery negative electrodes;

forming a clad material (200) in which the second metal material is arranged to be stacked on the first metal material in the second region of the first metal layer in a stacking direction in which the battery negative electrodes extend to extend in the prescribed direction by bonding the second metal material to the first metal material to be stacked along the prescribed direction;

forming a plurality of the negative electrode terminals for batteries each including the first metal layer configured to be connectable to the battery terminal connecting plate made of Al or an Al alloy in the first region and the second metal layer configured to be connectable to the batter negative electrodes made of Cu or a Cu alloy in the second region from the clad material; and forming a hole portion passing through the first metal layer and the second metal layer in the second region, for connecting the battery negative electrodes inserted into the hole portion to at least the inner peripheral surface of the second metal layer.

16. The method for producing a negative electrode terminal for a battery according to claim 15, wherein
the step of preparing the first metal material includes a step of forming a recess portion (82) extending along the prescribed direction in the second region of the first metal layer, and
the step of forming the clad material to extend in the prescribed direction includes a step of bonding the first metal material and the second metal material to each other in a state of arranging the second metal material in the recess portion of the first metal material along the prescribed direction.

17. The method for producing a negative electrode terminal for a battery according to claim 16, wherein
the recess portion is a groove portion (82), and
the step of bonding the first metal material and the second metal material to each other in the state of arranging the second metal material in the recess portion has a step of bonding the first metal material and the second metal material to each other in a state of arranging the second metal material in the recess portion of the first metal material along the prescribed direction so that both end surfaces in a direction orthogonal to the prescribed direction are not exposed.

18. The method for producing a negative electrode terminal for a battery according to claim 16, wherein
the step of forming the plurality of negative electrode terminals for batteries from the clad material includes a step of forming the plurality of negative electrode terminals for batteries from the clad material by punching the plurality of negative electrode terminals for batteries out of the clad material at prescribed intervals in the prescribed direction.

19. A negative electrode terminal (8) for a battery configured to be connectable to a battery terminal connecting plate (101, 102) for connecting battery terminals (7, 8) of a plurality of batteries (1) with each other and battery negative electrodes (5) of the batteries and to be arrangeable on upper surfaces of lids (2) of battery cases of the batteries,
composed of a clad material formed by bonding:
a first metal layer (80), made of Al or an Al alloy, including a first region connected with the battery terminal connecting plate and an adjacent second region on the same surface side as the first region; and
a second metal layer (81), made of Ni or an Ni alloy, connected with the battery negative electrodes, wherein
the second metal layer is arranged to be stacked on the first metal layer in the second region of the first metal layer,
the first metal layer made of Al or Al alloy is configured to be connectable to the battery terminal connecting plate made of Al or an Al alloy in the first region, and the second metal layer made of Ni or Ni alloy is configured to be connectable to the battery negative electrodes made of Cu or a Cu alloy in the second region,
the second metal layer stacked on the first metal layer is connected with the battery negative electrodes in the second region of the first metal layer,
a recess portion (82) is formed in the second region of the first metal layer,
the second metal layer is bonded to the first metal layer in a state embedded in the recess portion of the first metal layer,
the thickness of the second metal layer is at least 10% and not more than 50% of the total thickness of the first metal layer and the second metal layer in the second region,
a hole portion (84) passing through the first metal layer and the second metal layer is formed in the second region, and
the negative electrode terminal for a battery is so configured that the battery negative electrodes inserted into the hole portion are connectable to at least the inner peripheral surface of the second metal layer.

\* \* \* \* \*